US008532101B2

(12) United States Patent
So et al.

(10) Patent No.: US 8,532,101 B2
(45) Date of Patent: Sep. 10, 2013

(54) SYSTEM AND METHOD FOR PROVIDING CO-SIGNALED RETURN LABEL SWITCH PATHS

(75) Inventors: Ning So, Plano, TX (US); Yat (Wallace) Lee, Plano, TX (US)

(73) Assignee: Verizon Patent Licensing Inc., Basking Ridge, NJ (US)

( * ) Notice: Subject to any disclaimer, the term of this patent is extended or adjusted under 35 U.S.C. 154(b) by 309 days.

(21) Appl. No.: 13/005,141

(22) Filed: Jan. 12, 2011

(65) Prior Publication Data

US 2012/0176930 A1   Jul. 12, 2012

(51) Int. Cl.
*H04L 12/56* (2006.01)
*H04J 1/16* (2006.01)

(52) U.S. Cl.
USPC ............ 370/389; 370/252; 370/254; 370/392

(58) Field of Classification Search
USPC .......... 370/252, 254, 389, 392; 709/238–242
See application file for complete search history.

(56) References Cited

U.S. PATENT DOCUMENTS

| 7,826,463 | B2 * | 11/2010 | Patel et al. | 370/401 |
| 2004/0215787 | A1 * | 10/2004 | Gibson et al. | 709/227 |
| 2012/0158992 | A1 * | 6/2012 | Lam | 709/238 |

* cited by examiner

*Primary Examiner* — John Pezzlo

(57) ABSTRACT

An approach is provided for establishing label switch paths associated with a new routing node of a label switch network. A new routing node is determined to be activated within a label switch network. Label pair generation logic is employed to generate a path set-up message to establish a pair of label switch paths between the new routing node and an activated routing node of the label switch network. Another path set-up message is repeatedly generated for each of a plurality of activated routing nodes within the label switch network to establish pairs of label switch paths.

20 Claims, 7 Drawing Sheets

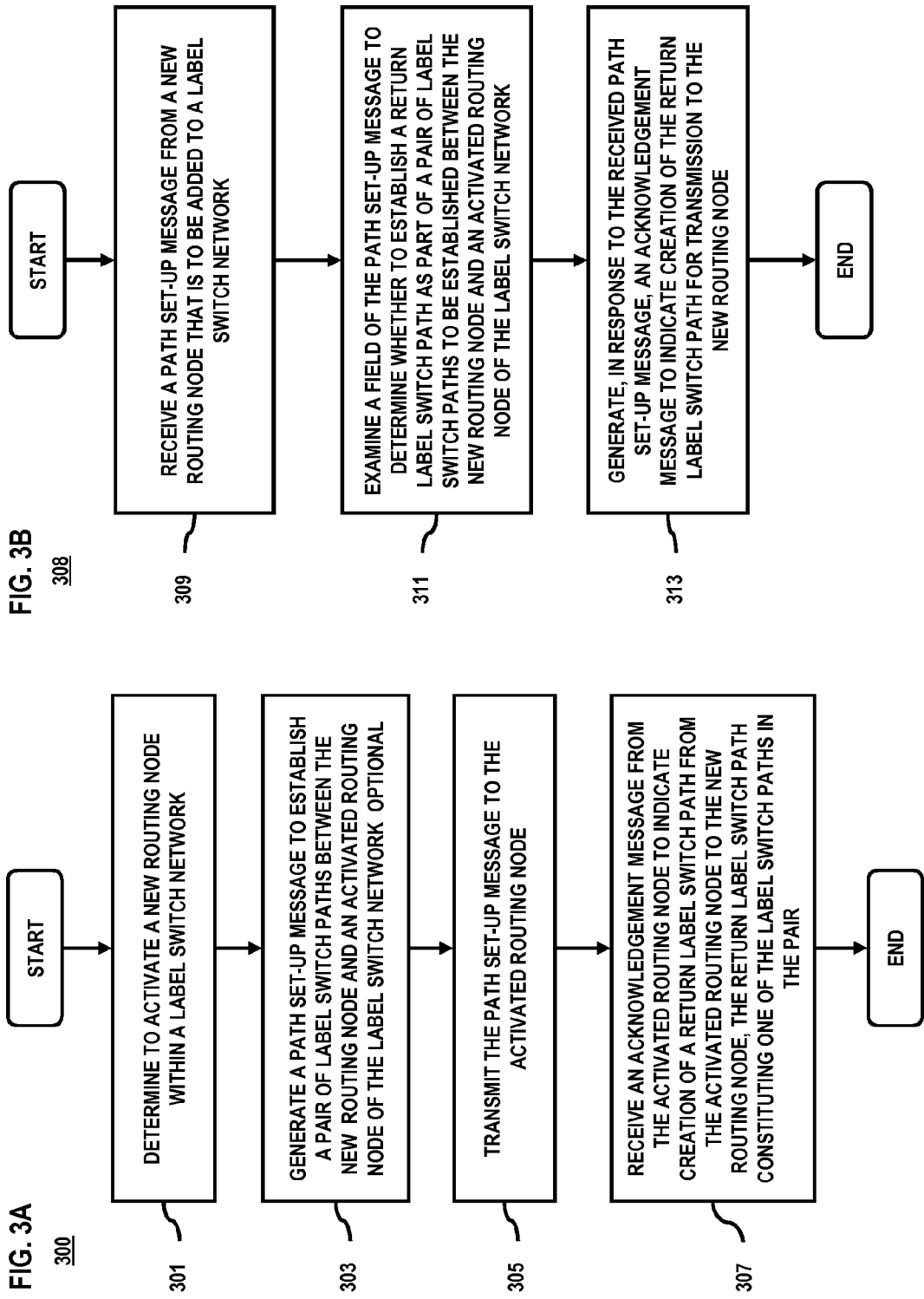

SYSTEM AND METHOD FOR PROVIDING CO-SIGNALED RETURN LABEL SWITCH PATHS

BACKGROUND INFORMATION

With the increase in demand for broadband communications and services, telecommunication service providers are constantly challenged to provide the fastest and most reliable service to their customers, including increasing network performance. Not surprisingly, many service providers employ label switch networks as a means of reducing bottlenecks and increasing performance in a network. Label switch networks feature various interconnected routers that forward data to one another according to one or more predetermined network paths. By way of this approach, data packets are labeled based on their characteristics and subsequently forwarded along a particular network path per the corresponding label.

Traditionally, the process for configuring a new router into an existing label switch network has involved execution of a router device login, network path set-up/interconnection build, functional check and security verification. This procedure must be performed, often manually, for each of the routers within the network to ensure proper establishment of label switch paths between the newly added router and the existing routers of the network. Consequently, this process can be time consuming and labor intensive to carry out, especially for larger networks featuring multiple routers.

Therefore, there is a need for an approach that provides for effective and efficient configuration of label switch paths within a label switch network.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are flowcharts of a process for establishing label switch paths associated with a new routing node of a label switch network, according to various embodiments;

DESCRIPTION OF THE PREFERRED EMBODIMENT

A preferred apparatus, method, and software for facilitating establishment of label switch paths within a label switch network are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to networks that carry data packets using Multi-protocol Label Switching (MPLS) technology, it is contemplated that various exemplary embodiments are applicable to other equivalent systems and traffic flows. Furthermore, the various embodiments may have applicability to or be used in connection with other communication technologies, methodologies and network provisioning protocols, including resource reservation protocol (RSVP), internet control message protocol (ICMP), internet group messaging protocol (IGMP) and the like.

Figure 1A:
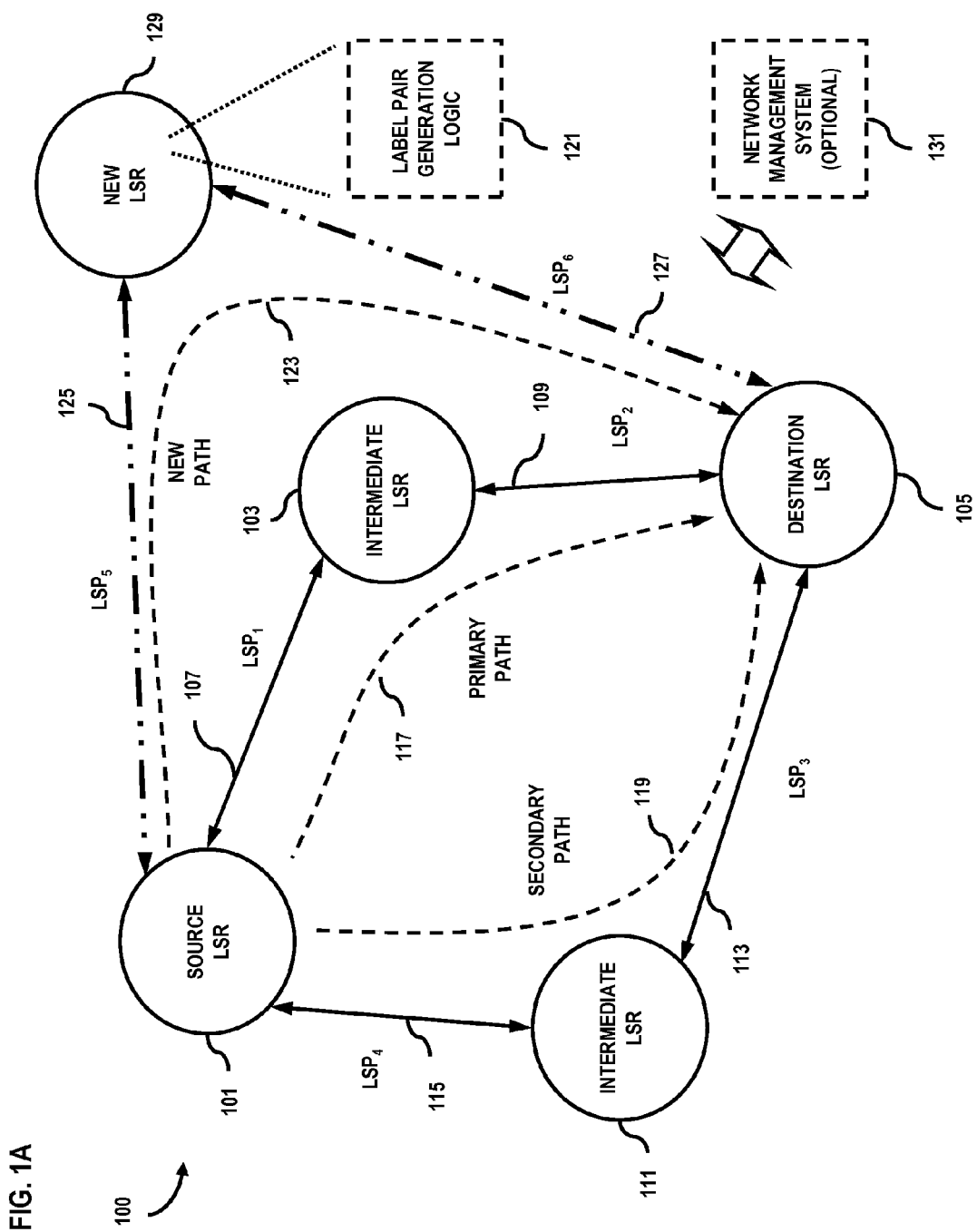
FIG. 1A is a diagram of a system for establishing label switch paths associated with a new routing node of a label switch network, according to an exemplary embodiment.

FIG. 1A is a diagram of a system for establishing label switch paths associated with a new routing node of a label switch network, according to an exemplary embodiment. For the purposes of illustration, a communication system 100 for facilitating the path set-up, device mapping and device configuration process required to be performed when introducing additional nodes into an existing network is described with respect to communication paths of a packet-switched infrastructure. In particular, certain embodiments are explained in the context of Multiprotocol Label Switching (MPLS) technology. This technology is based on setting up virtual paths between nodes in a network. MPLS provides high speed transfer of packets over data networks by appending labels to packets that contain information related to the path that the data packet will take to reach its destination. This eliminates the need for routers to examine the header of each packet, resulting in the faster delivery of packets to their destination. Even though various technologies such as MPLS predominantly support fast delivery of packets, it is noted that the characteristics and construction of the physical network infrastructure plays an equally vital role.

Multi-protocol label switching (MPLS) traffic engineering (TE) provides network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems). Routing protocols, such as open-shortest path first (OSPF) and intermediate system to intermediate system (IS-IS), are utilized to determine MPLS traffic flow routes through the network, as well as govern the distribution of routing information between nodes of the network(s).

In various embodiments, label switch network 100 may be encompassed within any suitable wireline and/or wireless network, and be managed by one or more service providers. For example, the network may include an integrated services digital network (ISDN), public switched telephone network (PSTN) or other like network. In the case of a wireless network configuration, the network may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. It is further contemplated that the communication network may include components and facilities to provide for signaling and/or bearer communications between the various components or facilities of system 100. In this manner, they may embody or include portions of a signaling system 7 (SS7) network, or other suitable infrastructure to support control and signaling functions.

In certain embodiments, system 100 includes a communication node, such as a source Label Switched Router (LSR) 101, that forwards MPLS packets to an intermediate node, i.e., LSR 103, by examining the label of the packets over a Label Switched Path (LSP$_1$) 107. The intermediate LSR 103 similarly forwards the packets to the destination LSR 105 over LSP$_2$ 109. In an alternative embodiment, more than one intermediate LSR may be present along the path that the packet travels. Hence, the path may comprise multiple segments (e.g., more than two segments). Also, there may not be any intermediate LSRs along the path between the source LSR 101 and the destination LSR 105; and the packets may instead travel along a single network segment. It is contemplated that other arrangements or topologies may be utilized by system 100. Furthermore, the paths 107 and 109 may include both wired (e.g., coaxial cable, twisted pair, fiber optic cable, etc.) as well as wireless connections.

Under the scenario of FIG. 1A, the route encompassing LSP$_1$ 107 and LSP$_2$ 109 is designated as the primary path 117, which handles the traffic under normal operations. Per the configuration of routing devices within the network 100, a secondary path 119 may also be provided that includes LSP$_3$ 113 and LSP$_4$ 115 as generated from the interconnection of intermediate LSR 111 between the source LSR 101 and the destination LSR 105. As with the primary path 117, more than one intermediate LSR may be present along the secondary path 119, and thus, may include a number of segments. Furthermore, as with the primary path 117, there may not be any intermediate LSRs along the secondary path between the source LSR 101 and the destination LSR 105. Still further, the packets may travel along a single network segment.

Typically, network service providers, communication service providers and like prefer to implement label switch networks that feature multiple paths for handling differing traffic conditions and data flow requirements. By way of example, a break in a fiber optic link, increased noise in the environment of a metallic cable or wireless system, a sudden drift of a satellite, equipment failure, increased capacity or demand on specific LSRs and other conditions may occur that impede the flow of data along the primary 117 or secondary path 119. Consequently, as infrastructure needs, customer demand or performance requirements change, a new LSR 129 may be added to the existing network infrastructure, thereby introducing a new path 123 for enabling conveyance of data from the source LSR 101 to a destination LSR 105. By way of example, the new path 123 encompasses LSP$_5$ 125 and LSP$_6$ 127. It is recognized that switch paths must be properly established respective to the existing nodes of a network and a newly added node in order to facilitate the transfer of data packets (information) across the network. Any disruption in the paths between network nodes results in packet loss, latency, or delay, causing slow service as well as intermittent interruptions of service to customers.

To establish the LSPs 125 and 127, a process is provided to integrate the new LSR 129 into the network 100. An exemplary approach 140 to introducing the new LSR into the label switch network 100 is described, in an exemplary embodiment, with respect to FIG. 1B, which presents a flowchart detailing the LSR configuration process.

It is noted that the procedure 140 traditionally is carried out by way of manual processing techniques, through execution of an optional network management system 131 for managing and sequentially executing the node integration process, or a combination thereof.

Figure 1B:
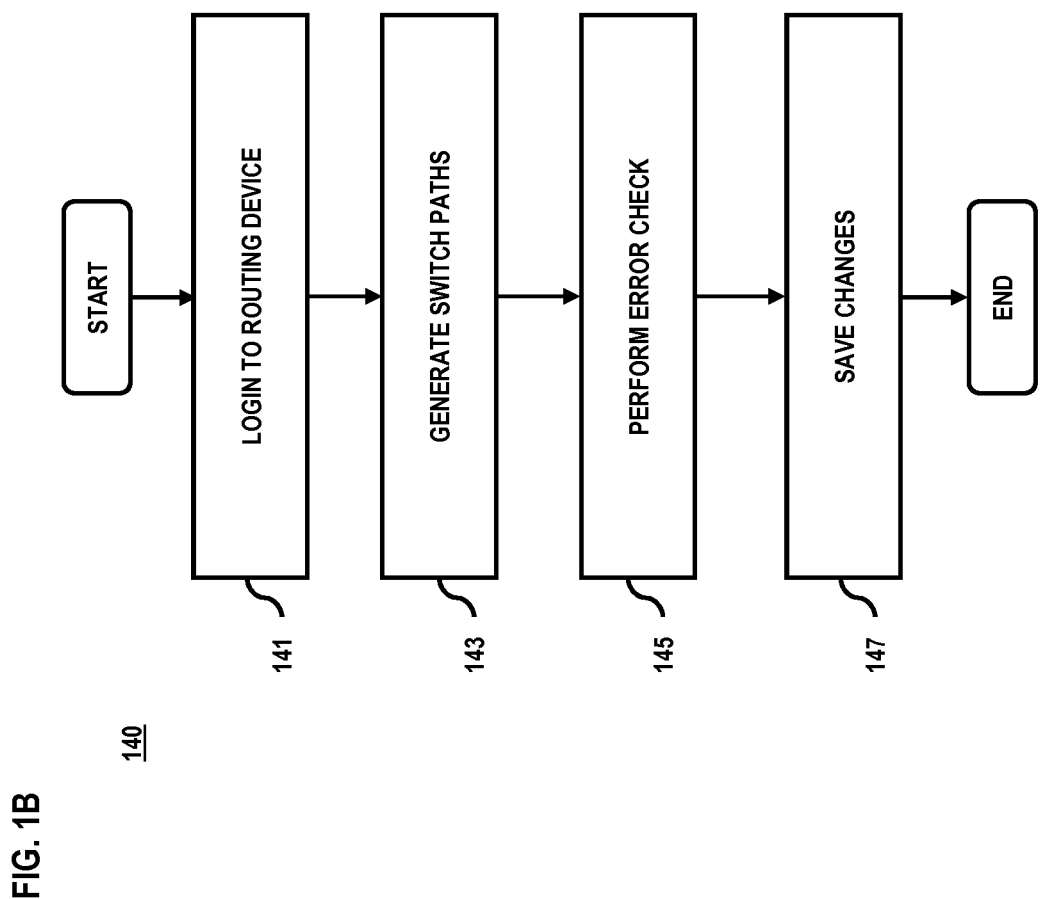
FIG. 1B is a flowchart of a workflow procedure associated with building label switch paths in the system of FIG. 1A, according to an exemplary embodiment.

FIG. 1B is a flowchart of a workflow procedure associated with building label switch paths in the system of FIG. 1A, according to an exemplary embodiment. By way of example, this process is explained in the context of an enterprise, whereby one or more users are designated as a network administrator to configure the network 100. In step 141, the network administrator logs into the routing node that is to be activated/configured (e.g., LSR 129) within the network. Such routing nodes can include a router, a switching hub, or any network element/component with functionalities to process and route data. In another step 143, new switch paths (e.g., LSPs 125 and 127) resulting from the addition of the new node are to be established. This step includes building a new mapping from the new router 129 to, for example, every other router (e.g., LSRs 101, 103, 105, 111) in the network 100. This process is traditionally performed manually or executed via a script (e.g., by the network management system 131) that inputs a prepared list of LSPs (with all the parameters and objects) to establish the associated paths.

In step 145, an error check process is performed to ensure the new LSPs (e.g., LSPs 125 and 127) are functional and that no damage or disruption to the network 100 has occurred as a result of the addition of the new routing node 129. Per step 147, the network administrator saves the changes and configuration settings established for the network 100. Under this approach, the new router 129 can begin signaling the LSPs as loaded, and the router 129 may be logged out of. This process is repeated for every other router in the network (e.g., LSRs 101-105 and 111), including the building and mapping of LSPs respective to the addition of the LSR 129.

Under the traditional approach to the above login, build, check, commit, and log out process can be extremely time consuming and labor intensive. However, the process is generally necessary because router login control and change control require very restrictive control to prevent operator error from harming the network. In addition, this process, conventionally, may not be performed via automated process for security reasons and/or regional control reasons.

To address this issue, system 100 enables label pair generation logic 121 to be implemented for automatically establishing pairs of label switch paths between the new routing node (e.g., LSR 129) and an already activated routing (existing) node (e.g., LSRs 101, 103, 105, 111) of the label switch network 100. That is, the logic 121 can employ a mechanism that reduces the time of the overall LSP building time by eliminating the multiple LSP build process. It is recognized that if the operators can build all LSPs (to and from LSPs) from the to-be-activated router, instead of building only the originating LSPs, significant time and labor savings can be realized. Moreover, the larger the network (from the perspective of number of routers), the more savings the approach of logic 121 can generate.

By way of example, the label pair generation logic 121 facilitates the transmission of a path set-up message to each of the nodes of the label switch path, thus reducing the overall time and effort required to configure the new path 123. In certain embodiments, a "path set-up message" pertains to message generated according to a communication protocol between respective nodes for indicating or requesting establishment of a label switch path respective to a given network node. For the purpose of illustration, it is noted that the label pair generation logic 121 for generating and conveying such messages can reside, in one embodiment, at the new network node 129. Alternatively, it is contemplated that the label pair generation logic 121 can be integrated and performed with respect to the network management system 131.

Of note, label switch networks, including those that employ MLPS communication, typically rely on unidirectional communication. For example, data packets are labeled by the source LSR 101 accordingly and then forwarded from one LSR within the network to another along a given PATH 117, 119 or 123. This forwarding process is executed through signaling that utilizes a tunnel message format, i.e., as supported via MLPS. In similar fashion, in accordance with an embodiment, path set-up messages may be passed along from the new LSR 129 to another node for generating/configuring paths 125 and 127 between the new LSR 129 and the source LSR 101 and destination LSR 105 accordingly. More details regarding the specific message format, including the various fields and data types that comprise a path set-up message, are described with respect to FIGS. 2A and 2B.

Figure 2A:
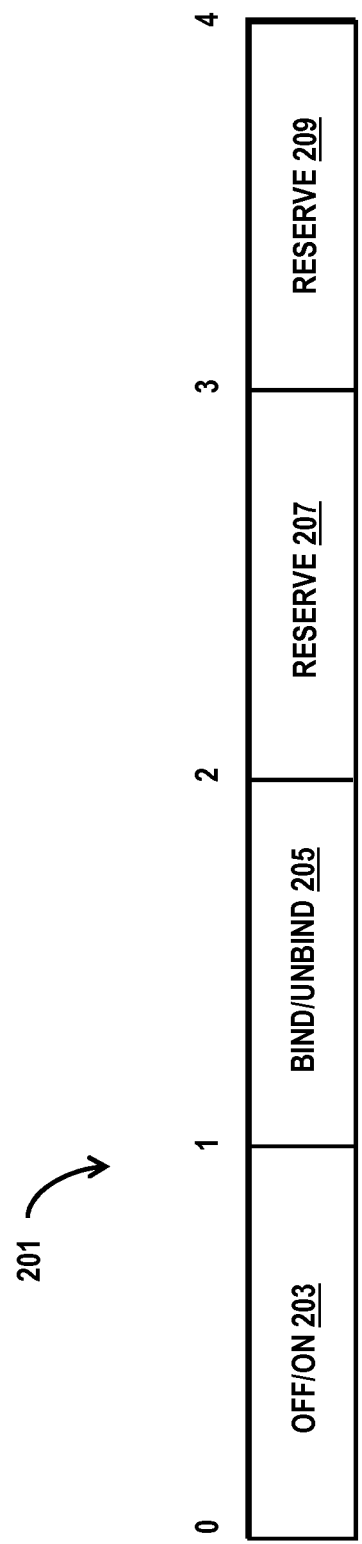
FIGS. 2A and 2B are diagrams of message formats for enabling a path set-up message to be conveyed to various routing nodes within a label switch network for configuring label switch paths, according to various embodiments.
Figure 2B:
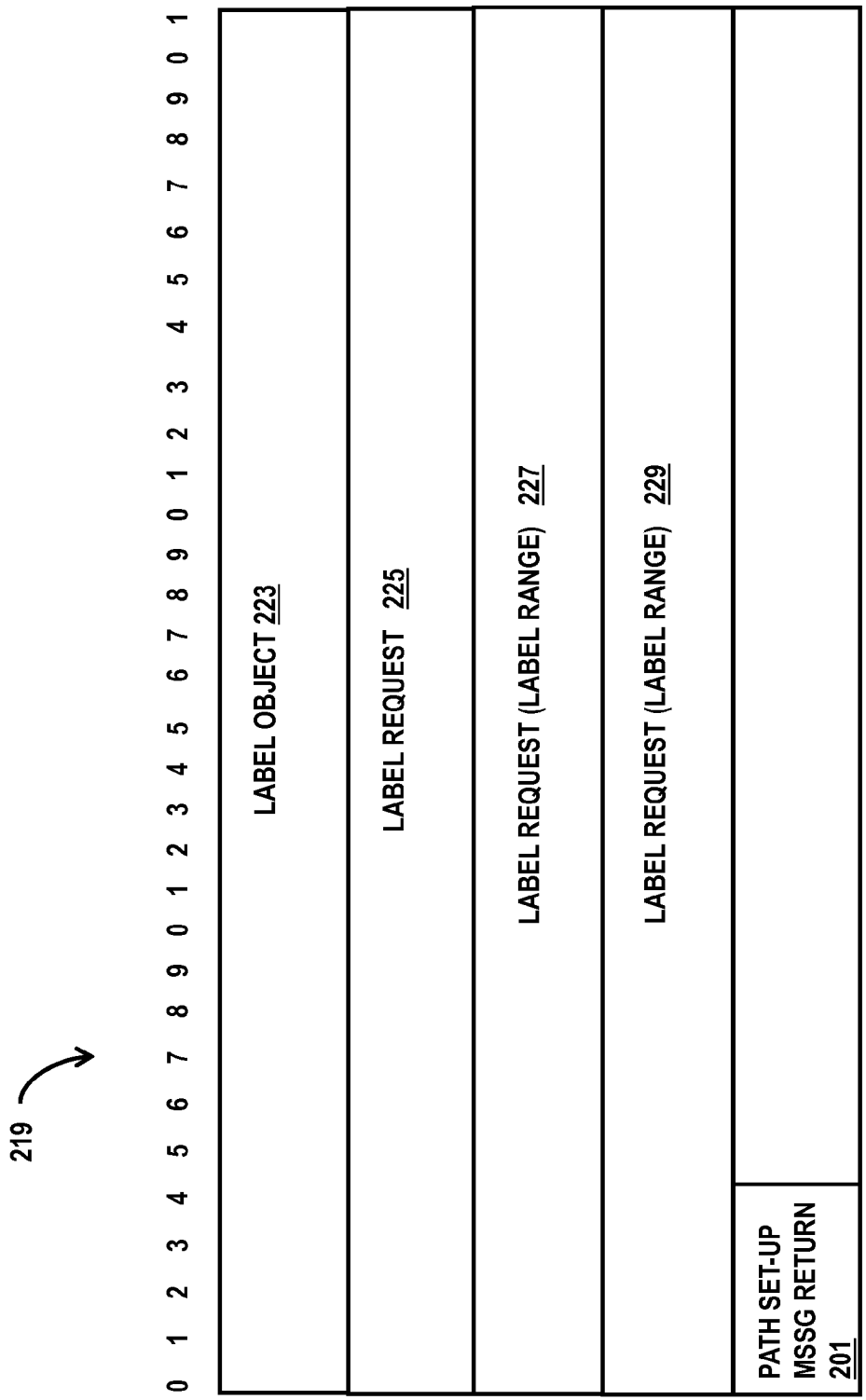

FIGS. 2A and 2B are diagrams of message formats for enabling a path set-up message to be conveyed to various routing nodes within a label switch network for configuring label switch paths, according to various embodiments. By way of example, the message format generated through execution of the label pair generation logic 121 enables LSPs to be established directly from the newly configured LSR 129 through execution of an LSP tunnel message object. The receiving router (e.g., destination LSR 105 or source LSR 101) acknowledges the path set-up message as transmitted from the new LSR 129, processes (e.g., parses, interprets) the path set-up message, and dynamically creates a LSP following transmission of a reservation message (Resv) back to the new LSR 129. The Resv message is sent to acknowledge activation of the new routing node and indicate creation of a co-signaled return label switch path from the activated routing node to the new routing node: such return path can be denoted as "co-signaled" in that the signaling of this return path is performed concurrently with the signaling to establish the forward path. By way of example, the IP destination address of the Resv message is changed to the address of the next node on the reverse path and the IP source address to the address of the previous node address on the reverse path. As such, a pair of LSPs is created as a result of the initial communication by the new LSR 129 to the corresponding LSR, one of which is the LSP generated in forwarding the message and the other pursuant to acknowledgement of the LSP—i.e., the return label switch path constituting one of the label switch paths in the pair.

The path set-up message (object) includes four bits 203-209 as shown in FIG. 2A, with the first bit 203 of the object being used for maintaining a value of 0 or 1 for turning the label switch path generation feature OFF or ON respectively. The OFF setting may be the default setting for the object as indicated by the label pair generation logic 121 of the new LSR 129 (or network management system 131). The second bit 205 maintains a value of 0 or 1 for indicating the option to-bind or not-to-bind the pair of generated LSPs, with the default setting of the LSP binding value being ON (0). For example, when the value is set to 0 through execution of the logic 121 by the new LSR 129 in communicating with the destination LSR 105, the LSP pairs resulting from the forward and reverse direction of LSP 127 are bound together. It is noted that this option enhances the capability of the labeled pair generation logic by executing the LSPs as mated pairs. As a result, if either of the LSP pairs goes down or otherwise become inoperable for any reason, such as due to network interference or other factors, both are affected. Finally, the third and fourth bits 207 and 209 of the object are for indicating a reserve message (resv) label value with respect to either of the given LSP pairs.

It is noted that the path set-up message (object) as described above may be configured for implementation with respect to IPv4 and IPv6. By way of example, the object may be implemented as the sixth object identified in Request for Comment (RFC) 3209 Section 3, entitled "LSP Tunnel related Message Formats," of the Internet Engineering Task Force (IETF). The updated message format, featuring the object name, corresponding RSVP protocol value and the sixth object (PATH SET-UP MSSG RETURN or "CO-SIGNALED RETURN") is as follows (as shown in Table 1):

TABLE 1

| Object name | Applicable RSVP messages |
| --- | --- |
| LABEL_REQUEST | Path |
| LABEL | Resv |
| EXPLICIT_ROUTE | Path |
| RECORD_ROUTE | Path, Resv |
| SESSION_ATTRIBUTE | Path |
| PATH SET-UP MSSG RETURN | Path, Resv |

A message format for incorporating the path set-up message (object) of FIG. 2A is shown in FIG. 2B. The message format includes a label object for specifying contents of a label 223 for facilitating packet forwarding, a label request value 225 for specifying a label type (e.g., with or without a specified label range, Frame Relay label range), label request values 227 and 229 for indicating a label range 227 from which the label request 225 may be generated. Each of these fields is configured to accommodate a 32-bit data value. As mentioned, the path set-up message return field 201 of the message format 219, per FIG. 2A, specifies an option to indicate whether a return label switch path is to be established.

FIGS. 3A-3B are flowcharts of a process for establishing label switch paths associated with a new routing node of a label switch network, according to various embodiments. For the purpose of illustration, the processes are described with respect to FIGS. 1A and 1B. It is noted that the steps of the process may be performed in any suitable order, as well as combined or separated in any suitable manner. For example purposes, the steps correspond to execution of the label pair generation logic 121 as performed at the LSR 129, network management system 131 or combination thereof. In step 301 of process 300, the label pair generation logic 121 determines to activate the new routing node 129 within the label switch network 100. This determination may be based on a signal detection process or by way of one of the procedures of FIG. 1B (e.g., logic process 141). Per step 303, a path set-up message is generated to establish a pair of label switch paths between the new routing node and an activated routing node of the label switch network 100. As mentioned, the path setup message may include various fields, including one for indicating whether a return label switch path is to be established (one of an LSP pair) and another for indicating an option to bind the label switch paths of the pair.

In step 305, the path set-up message is transmitted to the activated (existing) routing node (e.g., LSR 103). Per step 307, an acknowledgement message is received from the activated routing node 103 to indicate creation of a return label switch path from the activated routing node 103 to the new routing node 129. It is noted that the return label switch path constitutes one of the label switch paths in the pair. Still further, the logic 121 may be configured to repeatedly generate another path set-up message for each of the activated routing nodes within the label switch network 100 to establish pairs of label switch paths. Alternatively, the paths may be set-up among any number of the active (or activated) routing nodes, depending on the desired network topology. By way of this approach, the task of generating label switch paths may be automated and more efficiently executed.

In step 309 of process 308 (of FIG. 3B), a path set-up message is received from a new routing node (e.g., LSR 129) that is to be added to the label switch network 100. In another step 311, a field of the path set-up message may be examined, such as by the receiving node, to determine whether to establish a return label switch path as part of a pair of label switch paths to be established. The switch paths, under this scenario, are to be established between the new routing node 129 and the activated routing node (receiving node) of the label switch network 100. Per step 313, an acknowledgement message may be generated by the receiving node to indicate creation of the return label switch path for transmission to the new routing node (e.g., LSR 129).

The exemplary techniques and systems presented herein enable effective and efficient establishment of LSPs relative to the introduction or configuration of a new label switch router. By way of the approaches presented above, path set-up messages may be generated through execution of label pair generation logic by the newly added node for establishing a pair of label switch paths between the new node and an existing node of the network. This process may then be repeated for each node within the network as a means of minimizing the time and effort required of a network administrator or operator, and resultantly, for reducing the node integration and configuration process.

The processes described herein for establishing label switch paths associated with a new routing node of a label switch network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 4:
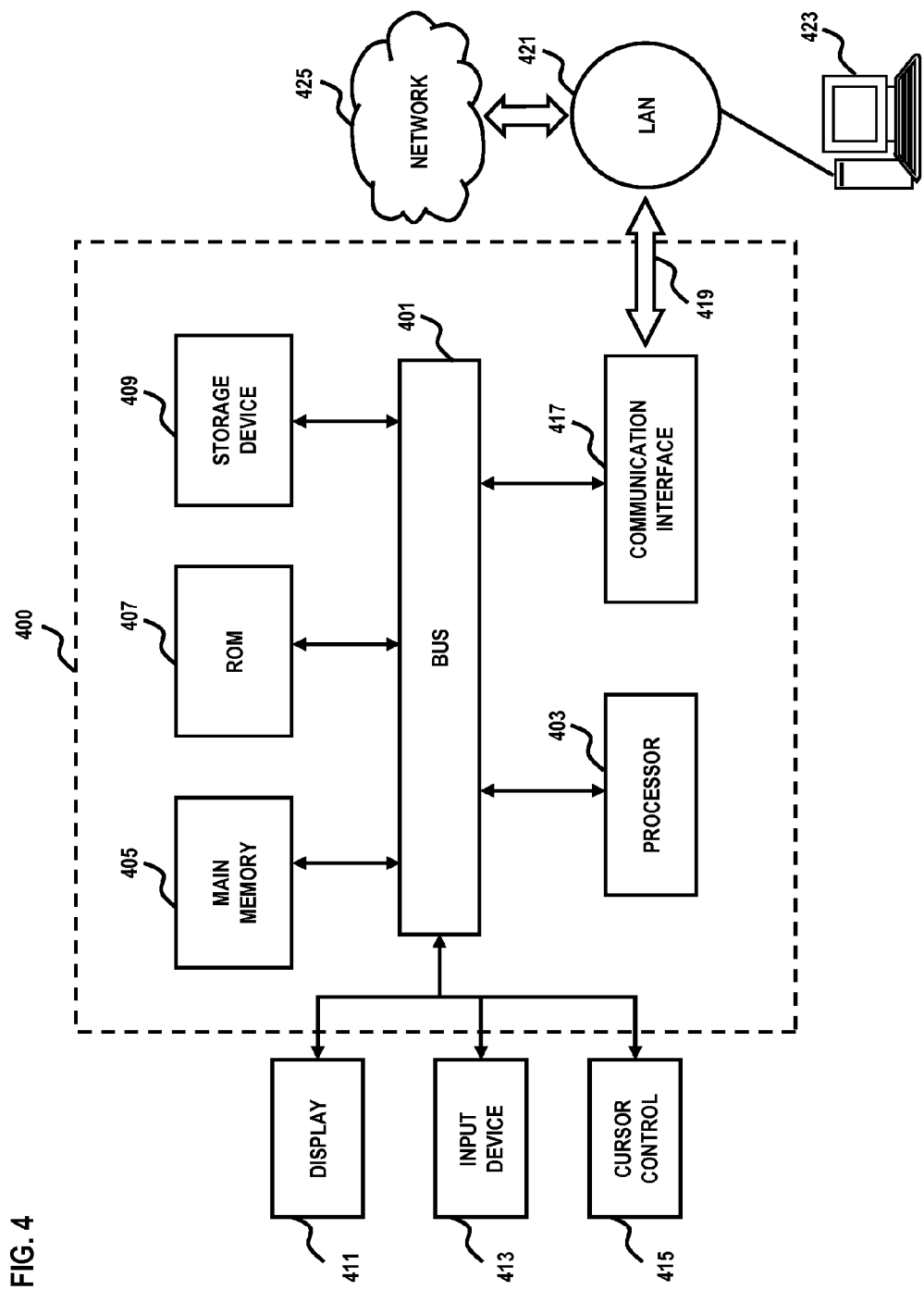
FIG. 4 is a diagram of a computer system that can be used to implement various exemplary embodiments.

FIG. 4 is a diagram of a computer system that can be used to implement various exemplary embodiments. The computer system 400 includes a bus 401 or other communication mechanism for communicating information and one or more processors (of which one is shown) 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for adjusting cursor movement on the display 411.

According to an embodiment of the invention, the processes described herein are performed by the computer system 400, in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the invention. Thus, embodiments of the invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 403 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electro-magnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 5:
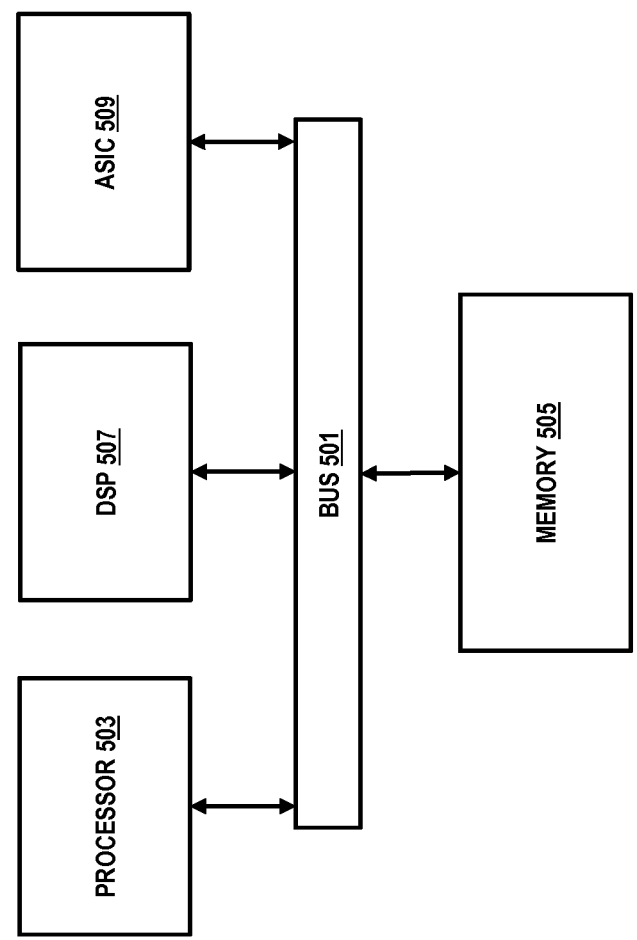
FIG. 5 is a diagram of a chip set that can be used to implement various exemplary embodiments.

FIG. 5 illustrates a chip set or chip 500 upon which an embodiment of the invention may be implemented. Chip set 500 is programmed to establish label switch paths associated with a new routing node of a label switch network as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of establishing label switch paths associated with a new routing node of a label switch network.

In one embodiment, the chip set or chip 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 500 includes merely one or more processors and some software and/or firmware supporting and/or relating to and/or for the one or more processors.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to establishing label switch paths associated with a new routing node of a label switch network. The memory 505 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining, via at least one processor, to activate a new routing node within a label switch network;
   generating, via the at least one processor, a path set-up message to establish a pair of label switch paths between the new routing node and an activated routing node of the label switch network;
   transmitting the path set-up message to the activated routing node; and
   receiving an acknowledgement message from the activated routing node to indicate creation of a return label switch path from the activated routing node to the new routing node, the return label switch path constituting one of the label switch paths in the pair.

2. A method according to claim 1, further comprising:
   repeatedly generating another path set-up message for each of a plurality of activated routing nodes within the label switch network to establish pairs of label switch paths.

3. A method according to claim 1, wherein the path set-up message specifies a field to indicate whether a return label switch path is to be established, the return label switch path constituting one of the label switch paths in the pair.

4. A method according to claim 3, wherein the path set-up message specifies another field to indicate an option to bind the label switch paths of the pair.

5. A method according to claim 4, wherein the path set-up message is generated according to a label switch path tunnel message format.

6. A method according to claim 1, wherein the label switch paths are established according to a multi-protocol label switching protocol (MPLS).

7. An apparatus comprising:
at least one processor; and
at least one memory including computer program code for one or more programs, the at least one memory and the computer program code configured to, with the at least one processor, cause the apparatus to perform at least the following,
determine to activate a new routing node within a label switch network,
generate a path set-up message to establish a pair of label switch paths between the new routing node and an activated routing node of the label switch network,
initiate transmission of the path set-up message to the activated routing node; and
receive an acknowledgement message from the activated routing node to indicate creation of a return label switch path from the activated routing node to the new routing node, the return label switch path constituting one of the label switch paths in the pair.

8. An apparatus according to claim 7, wherein the apparatus is further caused to:
repeatedly generate another path set-up message for each of a plurality of activated routing nodes within the label switch network to establish pairs of label switch paths.

9. An apparatus according to claim 7, wherein the path set-up message specifies a field to indicate whether a return label switch path is to be established, the return label switch path constituting one of the label switch paths in the pair.

10. An apparatus according to claim 9, wherein the path set-up message specifies another field to indicate an option to bind the label switch paths of the pair.

11. An apparatus according to claim 10, wherein the path set-up message is generated according to a label switch path tunnel message format.

12. An apparatus according to claim 7, wherein the label switch paths are established according to a multi-protocol label switching protocol (MPLS).

13. A method comprising:
receiving a path set-up message from a new routing node that is to be added to a label switch network; and
examining a field of the path set-up message to determine whether to establish a return label switch path as part of a pair of label switch paths to be established between the new routing node and an activated routing node of the label switch network.

14. A method according to claim 13, further comprising:
generating, in response to the received path set-up message, an acknowledgement message to indicate creation of the return label switch path for transmission to the new routing node.

15. A method according to claim 13, wherein the path set-up message specifies another field to indicate an option to bind the label switch paths of the pair, the path set-up message being generated according to a label switch path tunnel message format.

16. A method according to claim 13, wherein the label switch paths are established according to a multi-protocol label switching protocol (MPLS).

17. An apparatus comprising:
at least one processor; and
at least one memory including computer program code for one or more programs, the at least one memory and the computer program code configured to, with the at least one processor, cause the apparatus to perform at least the following,
receive a path set-up message from a new routing node that is to be added to a label switch network, and
examine a field of the path set-up message to determine whether to establish a return label switch path as part of a pair of label switch paths to be established between the new routing node and an activated routing node of the label switch network.

18. An apparatus according to claim 17, wherein the apparatus is further caused to:
generate, in response to the receive path set-up message, an acknowledgement message to indicate creation of the return label switch path for transmission to the new routing node.

19. An apparatus according to claim 17, wherein the path set-up message specifies another field to indicate an option to bind the label switch paths of the pair, the path set-up message being generated according to a label switch path tunnel message format.

20. An apparatus according to claim 17, wherein the label switch paths are established according to a multi-protocol label switching protocol (MPLS).

* * * * *